United States Patent

[11] 3,585,398

| [72] | Inventor | Luke M. Harvey |
| | | Schenectady, N.Y. |
| [21] | Appl. No. | 865,913 |
| [22] | Filed | Oct. 13, 1969 |
| [45] | Patented | June 15, 1971 |
| [73] | Assignee | General Electric Company |

[54] BRUSHLESS EXCITATION OF A STEAM TURBINE GENERATOR UTILIZING A DRIVER ACYCLIC GENERATOR
6 Claims, 2 Drawing Figs.

| [52] | U.S. Cl. | 290/52, |
| | | 310/178, 322/47 |
| [51] | Int. Cl. | H02k 7/18 |
| [50] | Field of Search | 310/178, |
| | | 243, 114, 268; 322/47, 48; 290/52 |

[56] References Cited
UNITED STATES PATENTS

| 890,697 | 6/1908 | Noeggerath | 322/48 |
| 1,304,287 | 5/1919 | Emmet | 322/47 |
| 1,465,251 | 8/1923 | Broluska | 310/178 |
| 3,293,470 | 12/1966 | Polgreen | 310/178 |
| 3,333,130 | 7/1967 | Brouee | 310/178 |
| 3,436,575 | 4/1969 | Harvey | 316/178 |
| 3,497,739 | 2/1970 | Appleton | 310/178 |

Primary Examiner—D. F. Duggan
Assistant Examiner—R. Skudy
Attorneys—James T. Comfort, James C. Davis, Jr., Frank L. Neuhauser, Oscar B. Waddell and Joseph B. Forman ABSTRACT: DC excitation for a steam turbine generator rotating at speeds of 1,800 to 3,600 revolutions per minute is provided by an acyclic generator mechanically joined to the rotor of the steam turbine generator by coaxial electrical conductors extending axially into the steam turbine generator rotor. At a location remote from the steam turbine generator, the outer coaxial conductor is divided into axially adjacent segmented sections by insulating discs of, for example, aluminum oxide, and the rotary halves of first and second liquid metal collectors of an acyclic generator are disposed on each segment to produce current flow in the outer coaxial conductor. The generated current then is conducted through the outer coaxial conductor to one terminal of the steam turbine generator field windings and the current returns to the acyclic generator through the inner coaxial conductor and a clamp electrically interconnecting the coaxial conductors at the ends of the conductors remote from the steam turbine generator. A suitably insulated stainless steel drum also is provided in an underlying attitude relative to the segmented portions of the outer coaxial conductor to support the acyclic generator rotor situated thereon.

INVENTOR.
LUKE M. HARVEY

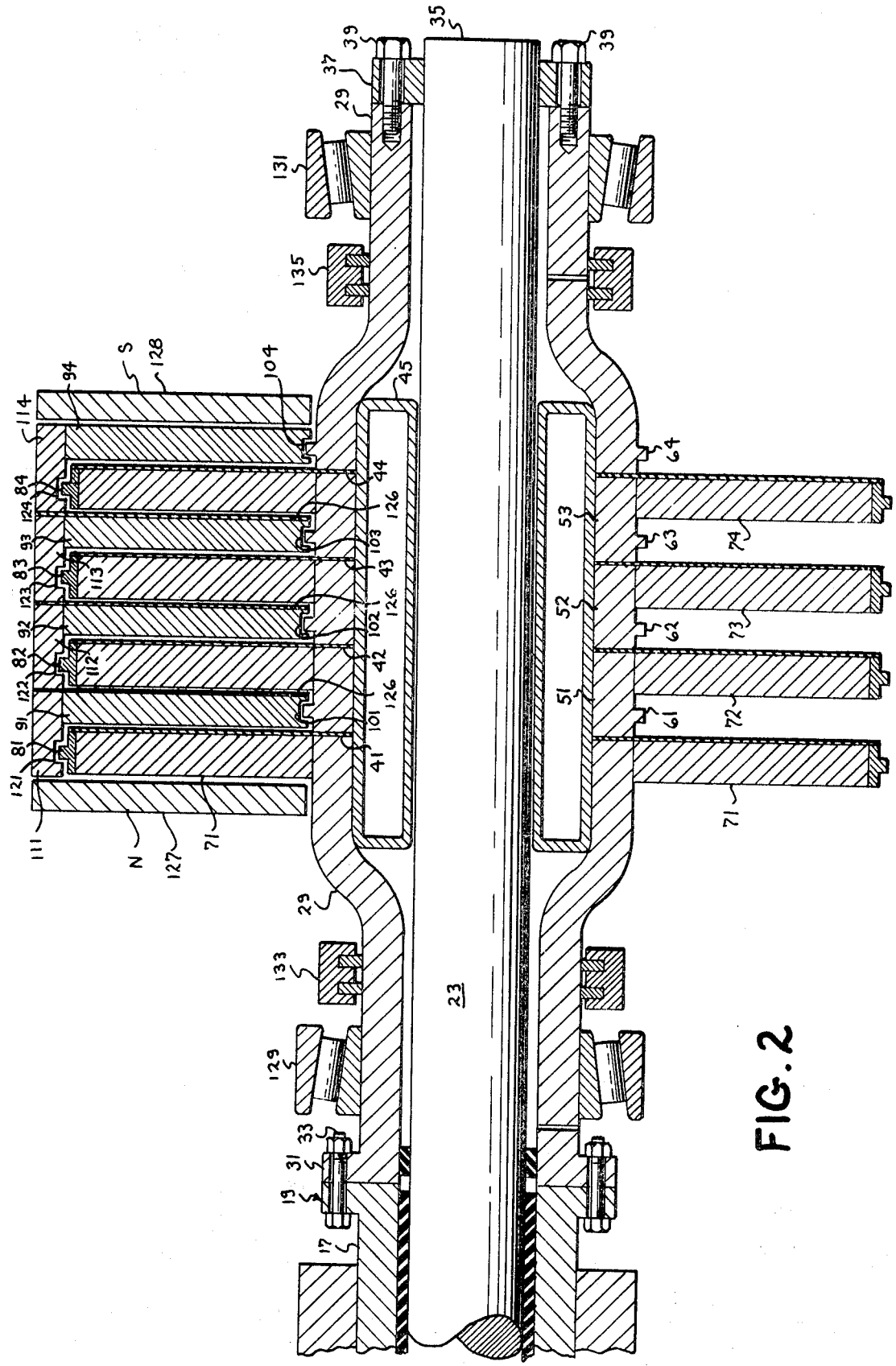

BRUSHLESS EXCITATION OF A STEAM TURBINE GENERATOR UTILIZING A DRIVER ACYCLIC GENERATOR

There is presently a problem in providing excitation for steam turbine generators because of their high speed, and the necessity for high power for excitation. Steam turbine generators normally rotate at high speeds of 1,800 to 3,600 revolutions per minute. Large steam turbines rotating at such high speeds require high power for excitation. There are presently three primary ways of providing excitation for steam turbine generators, each of them with problems. A direct current generator may be used with the DC generator geared to the shaft of the steam turbine generator and the power fed back through slip rings. At the higher speeds, there is a significant problem with the gearing required, and also, there is a problem of brush maintenance. An AC generator may be used with the AC current rectified and fed back through slip rings. This also results in the problem of brush maintenance. Brushless excitators are used satisfactorily in some instances, however, there is a limitation of the power output at the higher speeds such as 3,600 revolutions per minute. The larger generators may require 16,000 kilowatts of excitation, and the brushless excitators simply cannot provide that power.

It is therefore an object of this invention to provide a new and improved steam turbine generator.

It is another object of this invention to provide a new and improved steam turbine generator having a new excitation system. Another object of this invention is to provide a new and improved steam turbine generator excitation system which will provide necessary high power requirements.

IN THE DRAWINGS

FIG. 2 shows an acyclic generator connected to the rotor of the generator rotor shown in FIG. 1.

Figure 1:
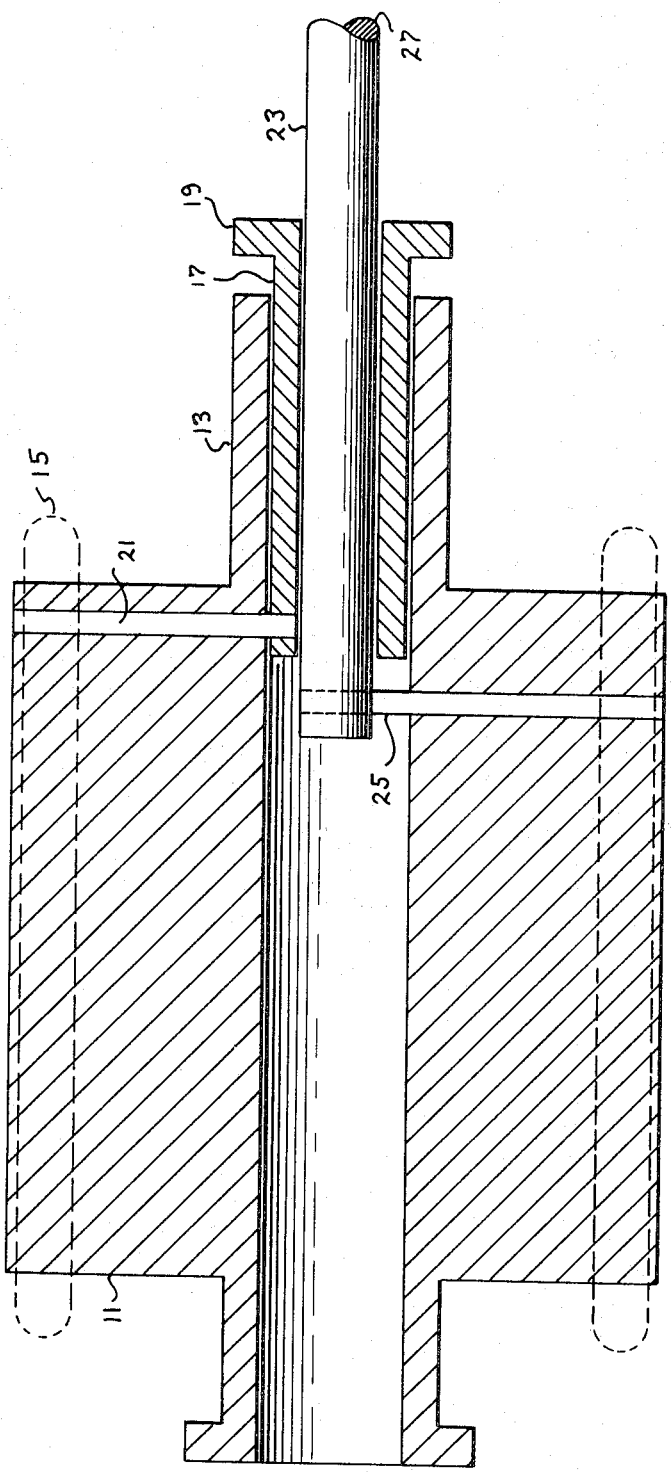
FIG. 1 shows a generator rotor of a steam turbine generator.

Referring first to FIG. 1, the rotor 11 of a steam driven turbine generator normally rotates at a speed of 1,800 to 3,600 revolutions per minute. The rotor 11 has a hollow shaft 13, e.g. of steel, and a field winding 15. A hollow copper conductor 17 is inserted in and secured to the steel shaft 13 so that the rotation of the generator rotor 11 also rotates the copper-flanged conductor 17. The outer hollow copper conductor 17 has a flange 19 thereon. The outer copper conductor 17 is connected by an electrical connector 21 to one end of the field winding 15. An inner copper conductor 23 of a solid copper material is connected by an electrical connector 25 to the other end of the field winding 15. The solid copper conductor 23 extends unbroken into FIG. 2 in a manner to be described.

Now referring to FIG. 2, an acyclic generator is shown. The flange 19 of the outer conductor 17 is joined to another copper conductor 29 at a flange 31 by a plurality of bolts 33. Thus, when the steel shaft 13 shown in FIG. 1 of the generator rotor 11 rotates, rotating the outer hollow conductor 17, the conductor 29 also rotates. The inner copper conductor 23 shown in FIG. 1 is shown extended unbroken in FIG. 2 through the acyclic generator until it terminates at an end 35. Inner conductor 23 is rigidly connected at its end 35 by a clamp 37 and machine screws 39 to an extension of the outer conductor 29. The copper conductor 29 in FIG. 2 is broken by insulation at points 41 thru 44. A hollow drum of stainless steel 45, insulated to prevent electrical conduction, supports the rotating discs of the acyclic generator in a manner to be described. Sufficient clearance is provided between the stainless steel drum 45 and the inner conductor 23 to enable the inner conductor 23 to be inserted through the hollow drum 45 and enable the outer conductor 29 to be clamped to the inner conductor 23 by means of clamp 37. Three-segmented drum pieces 51 thru 53 of highly conductive material such as copper are separated from outer conductor 29 by insulation 41 thru 44. Four surfaces 61 thru 64 are provided on the three-segmented drum pieces 51 thru 53 and the outer conductor 29 so that each surface provides the rotary half on a first liquid metal collector. Four annular plates 71 thru 74 of ferromagnetic material are secured to the outer conductive shaft 29 and the three-segmented drum pieces 51 thru 53 for rotation with the outer conductor 29 and the segmented pieces 51 thru 53. Four rings 81 thru 84 of highly conductive material are fixed to the outer peripheral surfaces of the annular plates 71 thru 74 to provide the rotary half of a second liquid metal collector. The insulation 41 thru 44 extends from the stainless steel metal drum 45 through the outer conductor 29 along the annular plates 71 thru 74 and along the rings 81 thru 84.

The first stator terminals 91 thru 94, formed in annular plates, are of ferromagnetic material such as low carbon steel. Inner peripheral surfaces 101 thru 104 of each stator terminal 91 thru 94, respectively, are formed to be the stationary half of the first liquid metal current collector. The stationary halves 101 thru 104 of the first liquid metal current collectors cooperate with the rotating halves 61 thru 64 of the rotary half of the first liquid metal collector.

The second terminals of the stationary stators 111 thru 114 are of highly conductive material, such as copper. Each stationary terminal 111 thru 114 includes an inner peripheral surface 121 thru 124 which provides the stationary half of the second liquid metal collector. Electrical insulation, generally designated by numeral 126, separates and insulates the second stator terminals 111 thru 114 from each other and extends along the side of the first stationary stator terminals 91 thru 94.

The presently preferred approach to obtaining the indicated joints between the bodies of highly conductive material and the bodies of ferromagnetic material, particularly in the case where copper and low-carbon steel are respectively used, utilizes electron beam welding. Joints of exceptional mechanical strength and consistently high electrical conductivity are thereby provided. Threaded joints press and shrink joints, bolted construction, brazing and the like other well-known expedients can also be used when greater bulk is not objectionable, depending upon the particular material selected.

The electrical insulation material indicated by the heavy surface lines such as 126 and 41 thru 44 throughout the drawing are conveniently selected to be an aluminum-oxide coating of approximately 0.018 inch in thickness, although other suitable alternatives are, of course, available. Aluminum-oxide has been found to be particularly durable and effective, especially in the case where sodium-potassium is used as the conductive liquid metal in the respective current collector gaps. The aluminum-oxide is advantageously applied by oxyacetylene spraying and the coating is thereafter ground with a diamond wheel. The axial end surfaces of the rotor that includes rings 81 thru 84 and plates 91 thru 94 are electrically insulated and the remainder of the current gap between the rotor and stator, exclusive of the current collecting regions, is electrically insulated by providing insulation on the corresponding stator components as previously described.

It is desirable to electrically insulate the outer copper conductor 29 and the segments 41 thru 44 from the steel hollow drum 45 to prevent possible circulating currents in the shaft and further to provide insulation between the hollow steel drum 45 and the inner copper conductor 23. This insulation permits operation with a completely flooded gap between the rotor and stator should this condition occur inadvertently or be the normal mode of operation.

The liquid metal current collectors need not be of any particular kind insofar as the present invention is concerned. The current collector of the kind described in my copending U.S. Pat. application, Ser. No. 575,859, filed Aug. 29, 1966, assigned to the same assignee has been found to be highly advantageous in combination with the present invention.

The general principles of operation of the homopolar machine describes a well-known principle and can be found in the explanation of the "Farraday" disc and many textbooks relating to direct current machines. The machine described performs with equal facility as a motor or a generator, however, as described herein it is used as a generator. The active portion of the rotor, the portion in which electrical energy is converted or generated is annular plates 71 thru 74. The electromagnetic flux, or magnetic field, is established between pole pieces 127 and 128 and extends axially thru the ferromagnetic plates 71 thru 74 and 91 thru 94 and across the clearance gaps adjacent both axial ends of plates 71 thru 74. The only useful field is that which passes between the two current collectors. Designations "N" and "S" of pieces 127 and 128 in the drawing serve only to readily identify them as cooperating magnetic poles and the polarity could as well be reversed. Circular plates 71 thru 74 and 91 thru 94 are most conveniently provided with substantially rectangular cross sections as with the other basic components described in which event their axial dimensions and radial dimensions are respectively substantially equal.

By the term highly conductive material as used herein and in the intended claims, it is intended that a nonmagnetic material having a conductivity in the order of copper is to be used. The presently preferred material is chromium-alloy copper having from one-half percent to 1 percent chromium. Presently preferred ferromagnetic material is vacuum degassed carbon steel AISI Standard 1020 (having 0.2 percent carbon).

The field coil surrounds the stator element shown, however the field coil itself is not specifically shown in this drawing.

The outer conductor 29 rotates in bearings 129 and 131.

Seals 133 and 135 are provided about the outer conductor 29.

OPERATION

The generator rotor 11 rotates in the normal manner for a generator rotor on its rotor shaft 13. The inner conductor 23 and the outer conductor 17 rotate with the rotation of the rotor shaft 13. Outer conductor 29 in FIG. 2 is an extension the outer conductor 29 shown in FIG. 1, and the inner conductor 23 is secured to the extension of the outer conductor 29 by clamp 37 so that there is a provision for electrical current flow. As the generator rotor 11 rotates, the inner conductor 23 rotates, rotating the outer conductor 29 and the annular plates 71—74. The Acyclic generator generates power which is applied to the field winding 15 for excitation purposes.

What I claim as new and desire to secure by Letters Patent of the United States is:

1. A steam turbine generator comprising a rotor of a steam driven generator, said rotor having field windings and an axially disposed hollow shaft of steel, an outer copper conductor inserted in said steel shaft at a coaxial attitude relative to said shaft, an inner copper conductor inserted within said outer copper conductor, means connecting said field windings to said inner and outer copper conductors, an acyclic generator having a rotor and a stator, said rotor of said acyclic generator including an electrical conductor coaxially disposed relative to said steam turbine generator rotor and mechanically joined to said inner and outer copper conductors, to drive said acyclic generator rotor upon rotation of said steam turbine rotor, liquid metal current collectors disposed along the length of said acyclic generator rotor and means for feeding current generated at said liquid current collectors to said inner and outer copper conductors to provide excitation power to said field windings.

2. The invention claimed in claim 1 wherein a drum of stainless steel supports the outer conductor of said acyclic generator and insulates said outer conductor from said inner conductor.

3. The invention claimed in claim 2 wherein said drum is insulated from said outer conductor and said inner conductor.

4. A turbine generator comprising a rotor having field windings situated adjacent the periphery of said rotor, an acyclic generator having an electrically conductive rotor coaxially disposed relative to the rotor of said turbine generator, means mechanically joining said acyclic generator rotor to the rotor of said turbine generator to provide torque for said acyclic generator rotor, and conductive means disposed symmetrically about the axes of said acyclic generator and said turbine generator and said turbine generator rotors for transmitting current generated within said acyclic generator rotor to said field windings of said turbine generator, said conductive means being fixedly secured to said turbine generation rotor to rotate at a speed equal to the speed of said turbine generator rotor.

5. A turbine generator according to claim 4 wherein said conductive means are inner and outer coaxial conductors, said outer coaxial conductor being divided into axial segments along the length of said conductor by an electrical insulator, liquid metal current collectors disposed in a circumferentially overlying attitude relative to said axial segments to produce current flow within said outer coaxial conductor, means connecting said coaxial conductors to the respective terminals of said turbine generator field windings and means electrically interconnecting the ends of said inner and outer conductors remote from said turbine generator field windings.

6. A turbine generator according to claim 5 wherein said turbine rotor is characterized by a hollow shaft extending axially from the end of said rotor proximate said acyclic generator, said inner and outer coaxial conductors are disposed axially within said extended shaft and further including support means disposed between said inner and outer coaxial conductors at the axial location of said liquid metal current collectors.

UNITED STATES PATENT OFFICE
CERTIFICATE OF CORRECTION

Patent No. 3,585,398              Dated  June 51, 1971

Inventor(s)          LUKE  M.  HARVEY

It is certified that error appears in the above-identified patent and that said Letters Patent are hereby corrected as shown below:

In the Title, "Driver" should read -- Driven --

Column 4, line 26 - The words "and said turbine generator"

should be omitted

Column 4, line 29 - The word "generation" should read -- generator --

Signed and sealed this 11th day of April 1972.

(SEAL)
Attest:

EDWARD M. FLETCHER, JR.         ROBERT GOTTSCHALK
Attesting Officer              Commissioner of Patents